United States Patent
Popp

(10) Patent No.: US 9,952,324 B2
(45) Date of Patent: Apr. 24, 2018

(54) TIME OF FLIGHT (TOF) DISTANCE SENSOR

(71) Applicant: ESPROS Photonics AG, Sargans (CH)

(72) Inventor: Martin Popp, Chur (CH)

(73) Assignee: ESPROS Photonics AG, Sargans (CH)

( * ) Notice: Subject to any disclaimer, the term of this patent is extended or adjusted under 35 U.S.C. 154(b) by 0 days.

(21) Appl. No.: 15/596,293

(22) Filed: May 16, 2017

(65) Prior Publication Data

US 2017/0293031 A1    Oct. 12, 2017

Related U.S. Application Data

(63) Continuation of application No. PCT/EP2016/051296, filed on Jan. 22, 2016.

(30) Foreign Application Priority Data

Feb. 9, 2015 (EP) .................................. 15154379

(51) Int. Cl.
- *H01L 27/146* (2006.01)
- *G01S 17/89* (2006.01)
- *G01S 7/491* (2006.01)

(52) U.S. Cl.
CPC ............ *G01S 17/89* (2013.01); *G01S 7/4914* (2013.01)

(58) Field of Classification Search
CPC ................. H01L 27/144; H01L 27/146; H01L 27/14603; H01L 27/14605;
(Continued)

(56) References Cited

U.S. PATENT DOCUMENTS

| 6,777,659 B1 | 8/2004 | Schwarte |
| 9,117,712 B1 * | 8/2015 | Oggier ............. H01L 27/14609 |

(Continued)

FOREIGN PATENT DOCUMENTS

| DE | 198 21 974 A1 | 11/1999 |
| EP | 2 290 393 A2 | 3/2011 |
| EP | 2 743 724 A1 | 6/2014 |

OTHER PUBLICATIONS

International Search Report and Written Opinion (Application No. PCT/EP2016/051296) dated Apr. 11, 2016.

(Continued)

*Primary Examiner* — Thanh Y Tran
(74) *Attorney, Agent, or Firm* — Burr & Brown, PLLC

(57) ABSTRACT

TOF distance sensor for capturing the distance to an object by receiving radiation reflected by the object, said radiation emanating from a radiation source modulated by a modulation frequency, comprising a pixel matrix for recording a pixel image. The pixel matrix consists of demodulation pixels which are designed for rear-side reception of the radiation. The demodulation pixels comprise a conversion region for generating charge carriers from the received radiation, and a separating device for separating the charge carriers in accordance with the modulation frequency, and also a stop for partitioning-off the conversion region from the separating device in relation to the charge carriers, and also an aperture for passing the charge carriers from the conversion region into the separating device. The TOF distance sensor is embodied in such a way that in each case at least two demodulation pixels form a common aperture.

14 Claims, 5 Drawing Sheets

(58) Field of Classification Search
CPC ......... H01L 27/14609; H01L 27/14607; H01L 27/1461; H01L 27/14614; H01L 27/14638; H01L 27/1464; H01L 27/14641; H01L 27/14812; G01S 7/4865; G01S 17/08; G01S 17/89
See application file for complete search history.

(56) References Cited

U.S. PATENT DOCUMENTS

| | | |
|---|---|---|
| 9,377,532 B2 * | 6/2016 | Huber .................. G01S 7/4865 |
| 2009/0224139 A1 | 9/2009 | Buettgen et al. |
| 2011/0037969 A1 | 2/2011 | Spickermann et al. |
| 2014/0145281 A1 | 5/2014 | Bever et al. |
| 2014/0160459 A1 | 6/2014 | Huber et al. |

OTHER PUBLICATIONS

International Preliminary Report on Patentability (Application No. PCT/EP2016/051296) dated Jan. 12, 2017 (with English translation).

* cited by examiner

TIME OF FLIGHT (TOF) DISTANCE SENSOR

CROSS REFERENCE TO RELATED APPLICATIONS

This application is a continuation of International Application No. PCT/EP2016/051296 filed Jan. 22, 2016, which designated the United States, and claims the benefit under 35 USC § 119(a)-(d) of European Application No. 15154379.0 filed Feb. 9, 2015, the entireties of which are incorporated herein by reference.

FIELD OF THE INVENTION

The present invention relates to a TOF distance sensor comprising a pixel field.

BACKGROUND OF THE INVENTION

The prior art has disclosed TOF (time of flight) distance sensors which detect the phase shift of modulated light, which was emitted toward an object and reflected by the latter, and derive the distance to the object therefrom. An example of one such sensor is disclosed in US Patent Application Publication No. 2014/0145281 A1.

SUMMARY OF THE INVENTION

It is an object of the present invention to provide an improved distance sensor.

The distance sensor according to the present invention is a TOF distance sensor for capturing the distance to an object by receiving radiation reflected by the object from a radiation source modulated by a modulation frequency. The sensor comprises a pixel matrix for recording a pixel image. The pixel matrix consists of demodulation pixels, which are designed for the rear-side reception of the radiation. The demodulation pixels comprise a conversion region for generating charge carriers from the received radiation, and a separating device for separating the charge carriers in accordance with the modulation frequency, and also a stop for partitioning-off the conversion region from the separating device in respect of the charge carriers and also an aperture for passing the charge carriers from the conversion region into the separating device. Preferably, the TOF distance sensor may be embodied in such a way that in each case at least two demodulation pixels form a common aperture.

The common aperture may embody the advantage of increasing the sensitivity. Of the demodulation pixels and of making the distance sensor more effective. The common aperture may also have the advantage of allowing pixel dimensions to be designed to be smaller. The pixel matrix may embody the advantage of generating images, in particular, 3-D images.

Embodying the demodulation pixels for the rear-side reception of the radiation means that the radiation incidence into the conversion region is effected from the side facing away from the separating device and the evaluation region.

Preferably, to this end, the conversion region is formed by a thinned, e.g. 50 um thick, semiconductor layer which, on the front side thereof, embodies the separating device, for example, using CCD technology.

Preferably, the common aperture forms a closed circumference.

Preferably, the demodulation pixels each comprise an electronic evaluation region, wherein at least two demodulation pixels in each case form a spatially common evaluation region.

This may embody the advantage that parts of the common evaluation region may be used together and hence that parts of the evaluation region may be reduced.

Preferably, four demodulation pixels in each case form a common aperture. Preferably, four demodulation pixels each case form a spatially common evaluation region. Preferably, the apertures and evaluation regions form a checkerboard pattern. Preferably, the pixel matrix is substantially point symmetrical in each case in relation to the common apertures. Preferably, the pixel matrix is substantially point symmetrical in each case in relation to the common evaluation regions.

This may embody the advantage that the charge carriers which were generated in the region below a demodulation pixel reach the separating device of precisely this demodulation pixel. This may embody the advantage that the charge carriers keep the spatial information thereof in relation to the individual demodulation pixel. This may increase the resolution of the pixel matrix.

Preferably, the conversion region exhibits a doped substrate. Preferably, the conversion region exhibits a transparent rear-side electrode. Preferably, the substrate is a semiconductor substrate. Preferably, the substrate is weakly n-doped.

This may embody the advantage that the conversion region may be depleted such that the photoelectric effect may be formed therein by radiation.

Preferably, the separating device comprises a drift gate on the upper side of the substrate for attracting the charge carriers from the conversion region into the separating region. Preferably, the drift gate may also be formed by a plurality of drift gates which, in particular, have an ever-increasing potential toward the modulation gates for the purposes of attracting the charge carriers. Preferably, a drift gate may have such an embodiment that two modulation gates may be arranged at opposing positions. Optionally, the drift gate may be concomitantly embodied by the modulation gate or gates, for example, if an additional, constant potential, analogous to the drift gate, is applied to the modulation gate or gates.

Preferably, the separating device comprises at least one, in particular, two, modulation gates on the upper side of the substrate, in particular, at opposing positions of the drift gate, for alternately guiding the charge carriers in accordance with the modulation frequency from the drift gate to the modulation gates.

Preferably, the separating device comprises at least one, in particular, two, storage gates on the upper side of the substrate, in each case assigned to a modulation gate or the modulation gate, for collecting the charge carriers directed toward the assigned modulation gate.

Preferably, the separating device comprises at least one, in particular, two, transfer gates on the upper side of the substrate, in each case assigned to a storage gate or the storage gate, for intermittent forwarding of the charge carriers collected at the storage gates to floating diffusions.

Preferably, the separating device comprises at least one, in particular, two, floating diffusions in the upper side of the substrate, in particular, as n+ doped well, in each case assigned to a transfer gate or the transfer gate, for receiving the charge carriers forwarded by the transfer gates and for feeding same as voltage into the evaluation region.

Preferably, the gates are separated from the substrate by a nonconductive layer. Preferably, the demodulation pixels between stop and gates, in particular, between stop and modulation gate, storage gate and transfer gate, form a conduction channel for the charge carriers, which is controllable by the gates. Preferably, the gates control the charge carriers in the conduction channel in the style of a CCD. The conduction channel may facilitate an expedient rear-side illumination, which increases the efficiency of the demodulation pixel.

According to the present invention, the separating device comprises a drift gate for attracting the charge carriers from the conversion region into the separating region, wherein the demodulation pixels forming a common aperture in each case form of at least one common drift gate. Preferably, the common drift gate covers the region of the common aperture with substantially the same extent. According to the present invention, the common drift gate is complemented by a drift date individually assigned to the individual pixel. Preferably, the modulation gates are assigned to an individually assigned drift gate. Preferably, the common drift gate consists of a plurality of common drift gates.

This may embody the advantage that the TOF distance sensor becomes even more efficient.

Preferably, the stop comprises a buried layer in the substrate. Preferably, the buried layer is a p+ doped pSub layer.

This may embody the advantage that the generated electrons are reliably blocked by the layer.

Preferably, the aperture forms a closed recess.

This may embody the advantage that the pixel dimension may be designed to be particularly small.

The junction FET effect may lead to it not being possible to embody the aperture arbitrarily small in relation to the substrate thickness. By the combination to form a common aperture, the pixel dimension may have a smaller design than in the case of individual apertures for a given minimum opening.

Preferably, the evaluation region comprises at least a source follower, reset switch and select transistor.

Further features of the invention are specified in the drawings.

The advantages specified in each case may also be realized for feature combinations in the context of which they have not been specified.

BRIEF DESCRIPTION OF THE DRAWINGS

Exemplary embodiments of the present invention are depicted in the drawings and are explained in more detail below. Here, the same reference signs in the individual figures denote elements which correspond to one another.

DETAILED DESCRIPTION OF THE INVENTION

Figure 1:
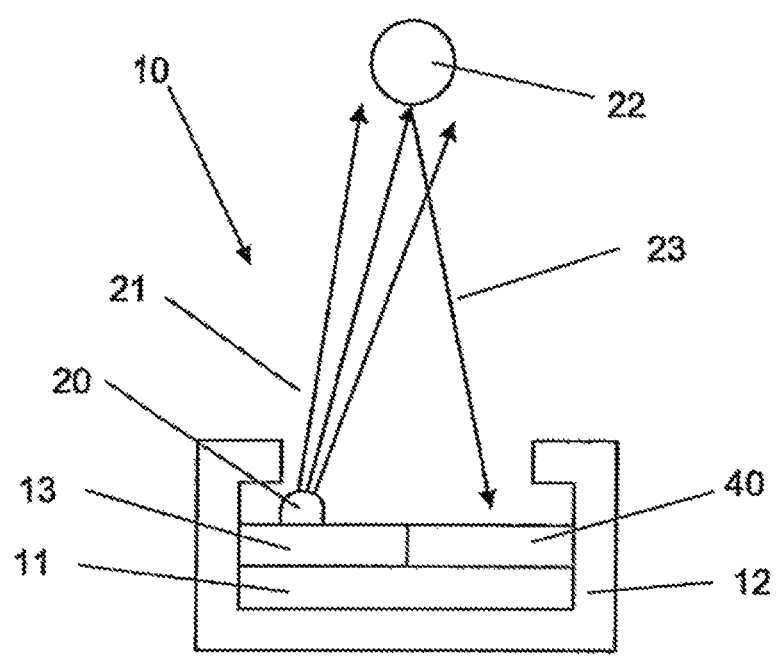
FIG. 1 shows a TOF distance sensor system with an object.

FIG. 1 shows a TOF distance sensor system 10 with object 22.

The object 22 is at a distance from the TOF distance sensor system 10. By way of example, the radiation source 20 is an LED or an arrangement of a plurality of LEDs. The radiation source is actuated by the electronics device 13 which operates the radiation source in an intensity modulated manner with a modulation frequency. By way of example, the radiation source emits monochromatic light 21, which is diffusely reflected at the object and incident on the TOF distance sensor 40 as reflected radiation 23. In the TOF distance sensor, the received radiation produces a value profile of induced photoelectrons, and hence a signal curve for the received radiation.

The electronics device 13 and the TOF distance sensor 10 are integrated on a chip and embodied in a combined CMOS/CCD method. The chip and the radiation source 20 are arranged on a common carrier 11 and surrounded by a housing 12. The radiation source and the receiving device each have an optics device not depicted in the drawings, which focuses in the direction of the space in which the distance of objects is intended to be determined.

The emitted radiation 21 has a wavelength of 860 nm and is pulsed with a sinusoidal signal or rectangular signal of 20 MHz. The reflected radiation received by the TOF distance sensor 10 remains pulsed with a sinusoidal signal or rectangular signal of 20 MHz and is phase shifted in relation to the modulation signal of the radiation emitted by the radiation source 20 by the time of the light path. The phase shift between emitted rectangular signal and received rectangular signal corresponds to twice the distance between TOF distance sensor and object.

Figure 2:
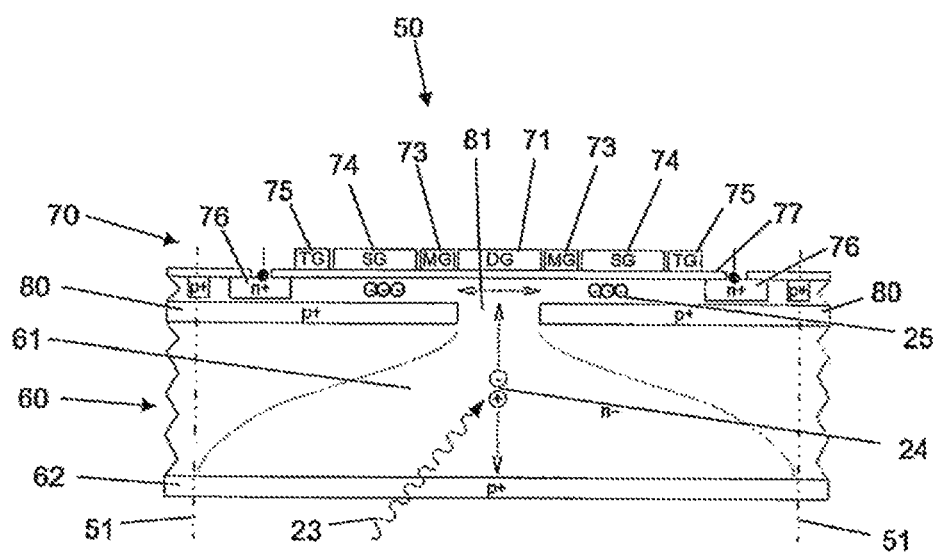
FIG. 2 shows a schematic side section of a demodulation pixel.

FIG. 2 shows a demodulation pixel 50 in a schematic side section.

Figure 3:
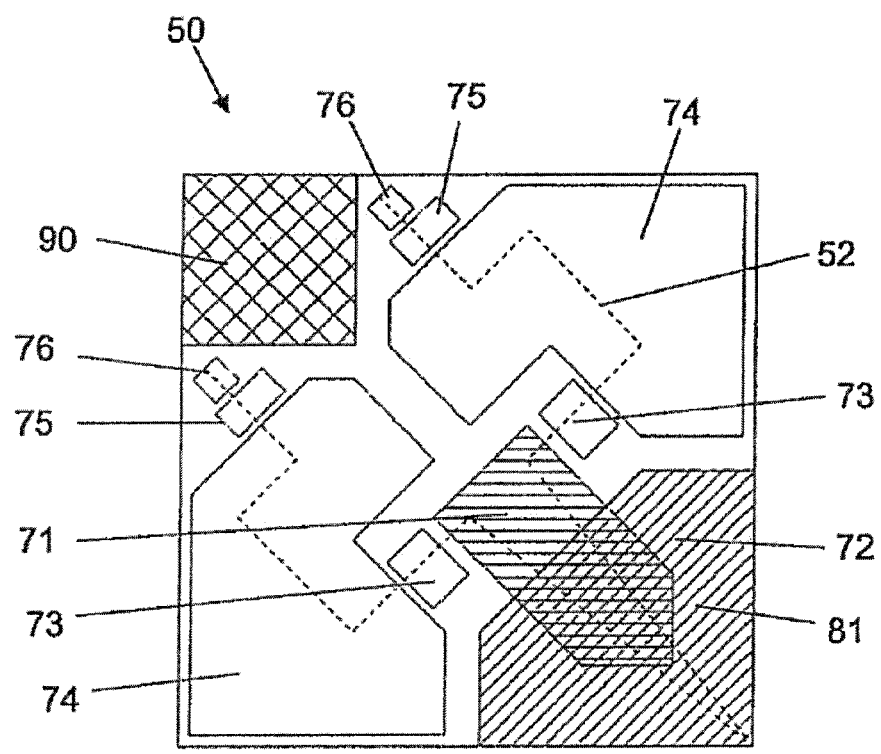
FIG. 3 shows a top view of a demodulation pixel.

The side section follows—not proportionately—the cut line 52 in the plan view of FIG. 3.

The demodulation pixel 50 comprises an n-doped float zone silicon semiconductor substrate 61 with a thickness of approximately 50 micrometers and a specific electric sheet resistance of greater than or equal to 2000 ohm cm. Arranged on the surface of the semiconductor substrate above a nonconductive SiO separating layer 77 on the substrate are a drift gate 71 and, on both sides in symmetric arrangement and in each case spaced apart from one another, in each case a modulation gate 73, a storage gate 74, a transfer gate 75 and, within the substrate, a floating diffusion 76. The layers and contacts expedient to this end are not depicted. A stop 80 is arranged between the gates and the transparent rear-side contact, and shadows the storage gates, transfer gates and the floating diffusion, including the semiconductor substrate lying below the respective gates, in relation to the incident reflected radiation 23, with the stop comprising an aperture 81 in the region below the drift gate. The semiconductor substrate is depleted, at least under the drift gate, but in particular overall. A positive potential is applied to the drift gate and the latter forms a depletion region in the semiconductor substrate.

The separating device 70 comprises the drift gate, the modulation gates, the storage gates, the transfer gates, the separating layer, the floating diffusions, the stop, the aperture and the substrate situated between the stop and the gates, said substrate being of the same type as the semiconductor substrate 61 in the conversion region 60. The conversion region 60 comprises the semiconductor substrate 61, the rear-side electrode 62 and the stop 80. The substrate has a thickness of approximately 50 micrometers.

The reflected IR radiation 23 penetrating into the semiconductor substrate 61 under the drift gate via the transparent rear-side electrode 62 induces electron-hole pairs 24 in the semiconductor substrate. The photoelectrons are attracted toward the drift gate by the depletion region which is formed by the drift gate 71. The drift gate has the potential of approximately 4 V. The number of attracted photoelectrons is proportional to the received radiation intensity.

A modulated potential, the maximum of which lies between the potentials of the drift gate 71 and at the storage gate 74 and the minimum of which lies below that of the drift gate, may be applied to the modulation gates 73. The potential of the modulation gate 73, for example, modulates between the values of 0 V and 5 V.

The two modulation gates are operated with mutually inverted potentials 20, i.e. the potential of the one modulation gate is 0 V when the potential of the other one is positive, and vice versa. Then, it is always the case that a potential of 0 V is applied to the one modulation gate and a potential of 5 V is applied to the other modulation gate. A potential minimum, i.e. 0 V in this case, leads to a potential barrier for the photoelectrons under the drift gate, and so no photoelectrons are able to reach the storage gate assigned to this modulation gate. A potential maximum, i.e. 5 V in this case, leads to draining of the photoelectrons under the drift gate, past this modulation gate and into its associated storage gate.

The flow of the photoelectrons produced by the received radiation intensity is guided in a manner corresponding to a switch by applying in each case a potential to the two modulation gates which in each case corresponds to mutually inverted sinusoidal signals or rectangular signals. The flow of these photoelectrons under the modulation gates arising thus corresponds to multiplication, i.e. a correlation of the corresponding sinusoidal signals or rectangular signals with the received radiation signal. Here, the sinusoidal signals or rectangular signals have the property of a correlating signal and are denoted correlation signal here.

A higher potential is applied to the storage gates 74 than to the drift gate 71 and said storage gates 74 alternately collect thereunder the photoelectrons 25 in accordance with the status of the modulation gates 73. The storage gates 74 for example have a potential of 10 V. The charges collected under the storage gates by the photoelectrons correspond to the correlation values. Hence, the correlation values are present in the charge domain. The collection of the photoelectrons under the corresponding storage gates corresponds to a temporal integration of the aforementioned correlation of correlation signal and received radiation signal.

For the purposes of detecting the photoelectrons 25 collected under the storage gates 74, the potential of the modulation gates 73 is firstly set to 0 V in order to form a potential barrier for the potential elections in the direction of the drift gate 71. Secondly, the potential of the transfer gates is raised to a middling value, for example 6 V, in order to facilitate a qualified drain of the photoelectrons in the direction of the floating diffusions 76.

Now, the positive potential of both storage gates 74 of approximately 10 V is lowered in parallel by means of a time ramp. The added potential of the dropping positive potential applied to the storage gates and the negative potential of the charge situated therebelow, which added potential changes in the process, determines whether charge can drain via the transfer gates 75. Here, the lowering process is subdivided into three phases. In a first phase of the time ramp, the aforementioned added potential still is more positive for both storage gates than the constant and equally positive potential 25 of the transfer gates, and no charge drains. In a subsequent second phase of the time ramp, the aforementioned added potential is more positive for one storage gate and more negative for the other storage gate when compared to the constant and equal positive potential of the transfer gate. As a result, charge under the storage gate with the more positive added potential drains via the associated transfer gate into the associated floating diffusion such that the added potential once again equals the potential of the corresponding transfer gate. In a subsequent third phase of the time ramp, the aforementioned added potentials of both storage gates are higher than the constant equal potentials. As a result, charges drain from under both storage gates via the respectively associated transfer gate into the respectively associated floating diffusion. The time ramp is stopped immediately once the third phase starts, i.e. the potential of the storage gates is not lowered any further such that, substantially, only the charge drainage from the second phase is relevant. The amount of charge now present in a charged floating diffusion thus corresponds to the difference between the amount of charge from both storage gates. Thus, the time ramp carries out a subtraction of the amounts of charge under the two storage gates.

After carrying out the above-described time ramp, the amount of charge in the one charged floating diffusion corresponds to a value of the phase difference between emitted radiation 21 and reflected radiation 23.

The amount of charge in the one charged floating diffusion is now converted into a corresponding voltage by means of a source follower and processed further. The source follower is part of the evaluation region of the demodulation pixel. In addition to the source follower, the evaluation region also comprises a reset switch and a select transistor.

The distance to the object may be calculated from the corresponding voltage by way of a method. By way of example, such a method is described in EP 2 743 724 A1 by the applicant.

FIG. 3 shows a top view of a demodulation pixel 50. The aperture 81 is 20 covered by the first drift gate 72 with approximately the same shape. A second drift gate 71 intersects the first drift gate in an electrically separated manner. The second drift gate and first drift gate act like a single drift gate, with a higher potential being applied to the second drift gate than to the first drift gate such that photoelectrons are forwarded from the first drift gate to the second drift gate. The demodulation pixel comprises two modulation gates 73 at opposite places at one end of the second drift gate. Lying opposite to the second drift gate, a storage gate 74 is in each case arranged next to the modulation gates. A transfer gate 75 is in each case arranged at one edge of the storage gates. Lying opposite to the storage gates, a floating diffusion 76 is in each case arranged next to the transfer gates. The floating diffusions are connected to the evaluation region and the source follower thereof.

The section line 52 shows the schematic, non-proportional profile of the side section in FIG. 2.

Figure 4:
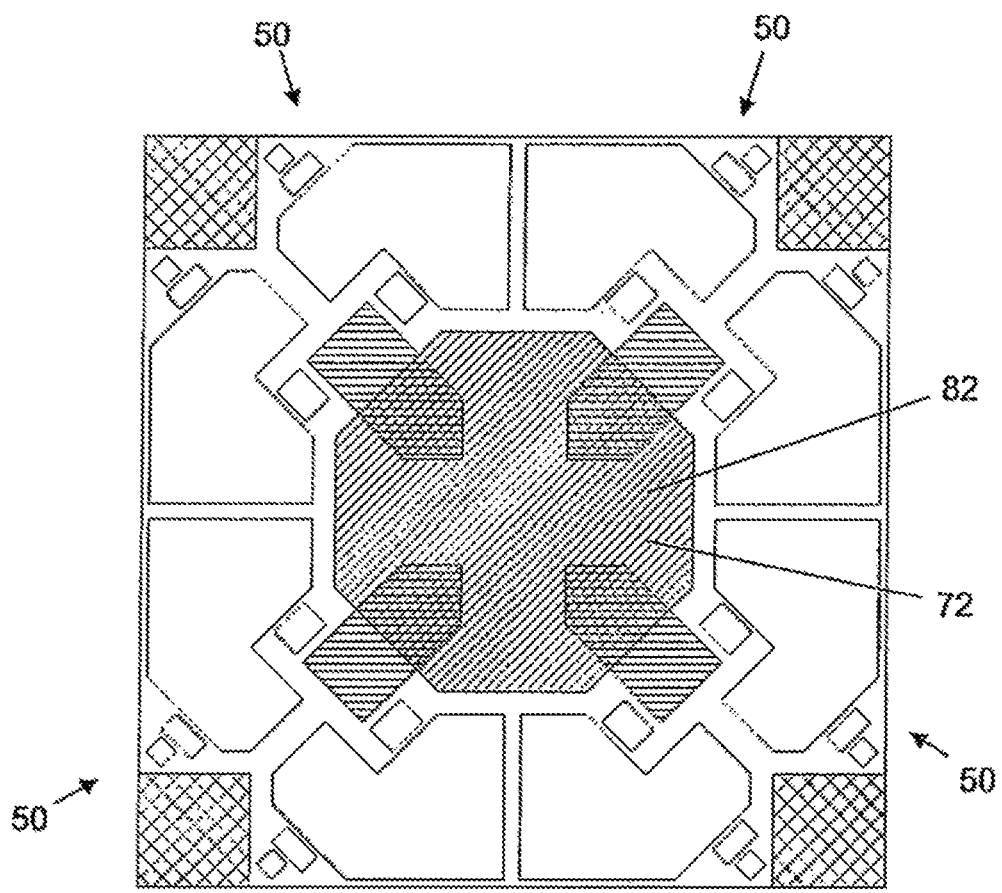
FIG. 4 shows four demodulation pixels with a common aperture.

FIG. 4 shows four demodulation pixels 50 with a common aperture 82. The demodulation pixels 50 arranged around the common aperture 82 correspond exactly to the demodulation pixel 50 shown in FIG. 3 and are rotated by 90° in each case. Overlaid on the common aperture 82 with the same shape is a common central drift gate 72. Objects of the drawings which are geometrically the same correspond to the corresponding devices in FIG. 3.

Figure 5:
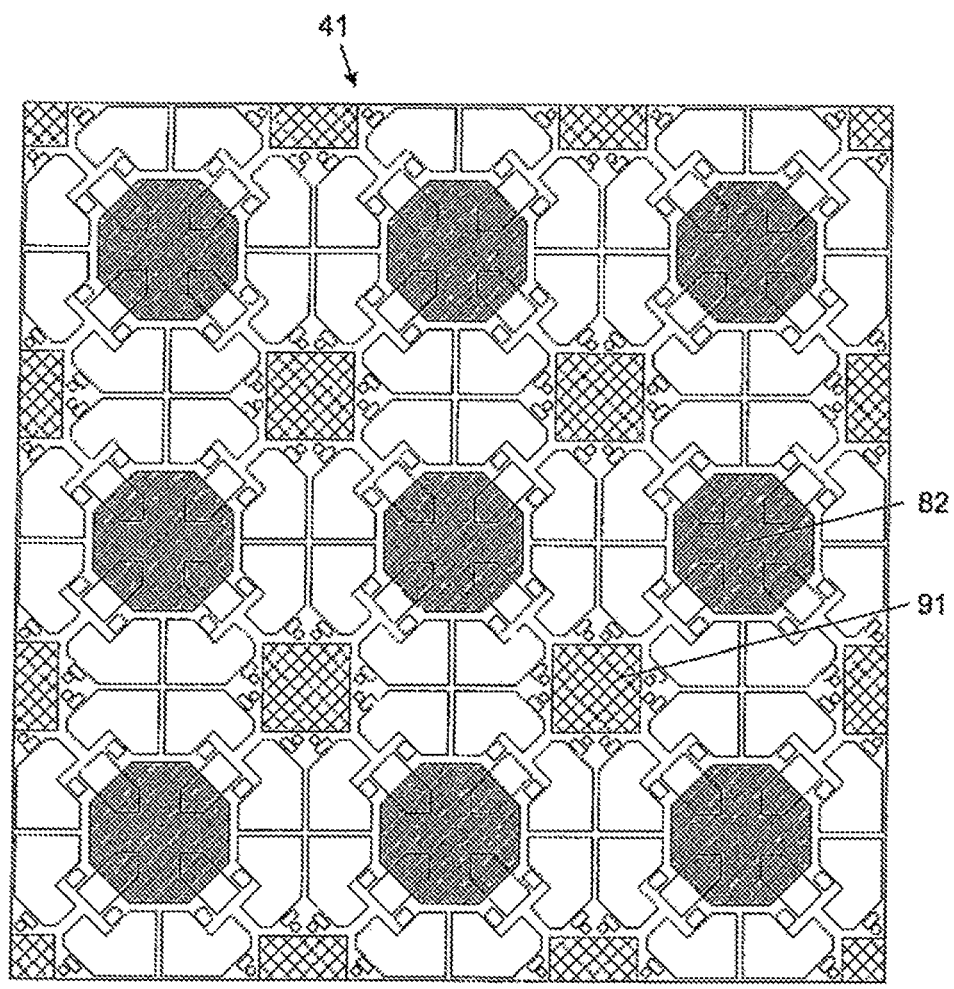
FIG. 5 shows a pixel matrix made of 6×6 demodulation pixels.

FIG. 5 shows a pixel matrix 41 made of 6×6 demodulation pixels 50. In addition to the common aperture 82, the arrangement also forms common evaluation regions 91. A common central drift gate is in each case overlaid on the common apertures 82. Objects of the drawings which are geometrically the same correspond to the corresponding devices in FIG. 4.

A method for evaluating the TOF distance sensor is disclosed in EP 2 743 724 A1.

Another method for evaluating the TOF distance sensor is disclosed in Robert Lange, Peter Seitz, Alice Biber, Stefan Lauxtermann: Demodulation Pixels in CCD and CMOS Technologies for Time-of-Flight Ranging, IST/SPIE International Symposium on Electronic Imaging, Conference on Sensors, Cameras, and Systems for Scientific/Industrial Applications II, Proc. SPIE, Vol. 3965A, San Jose, USA, $24^{th}$-$25^{th}$ January 2000.

The rear-side electrode may be contacted through the semiconductor substrate 61 by means of a potential tunnel. An apparatus for contacting the rear-side electrode 62 of the TOF distance sensor by means of a potential tunnel is disclosed in U.S. Pat. No. 8,901,690 B2.

The demodulation pixels may be embodied in analog CCD technology and the evaluation regions may be embodied in digital CMOS technology. A method for common production of demodulation pixels (CCD) and evaluation region (CMOS) is disclosed in U.S. Pat. No. 8,802,566 B2.

A method for the common embodiment of demodulation pixels (CCD, analog) and evaluation region (CMOS, digital) on a chip as a system-on-a-chip is disclosed in EP 2 618 180 B1.

LIST OF REFERENCE SIGNS

10 TOF distance sensor system
11 Carrier
12 Housing
13 Electronics device
20 Radiation source
21 Emitted radiation
22 Object
23 Reflected radiation
24 Electron-hole pairs
25 Photoelectrons
40 TOF distance sensor
41 Pixel matrix
50 Demodulation pixel
51 Boundary
52 Section line
60 Conversion region
61 Semiconductor substrate
62 Rear-side electrode
70 Separating device
71 Drift gate
72 Common drift gate
73 Modulation gate
74 Storage gate
75 Transfer gates
76 Floating diffusions
77 Separating layer
80 Stop
81 Aperture
82 Common aperture
90 Evaluation region
91 Common evaluation region

The invention claimed is:

1. A time of flight distance sensor for capturing a distance to an object by receiving radiation emanating from a radiation source modulated by a modulation frequency and then reflected by the object, said sensor comprising:
   a pixel matrix for recording a pixel image of demodulation pixels for rear-side reception of the radiation, respectively, comprising
      a conversion region for generating charge carriers from the received radiation,
      a separating device for separating the charge carriers according to the modulation frequency,
      a stop for partitioning-off the conversion region from the separating device in respect of the charge carriers and comprising an aperture for passing the charge carriers from the conversion region into the separating device,
   wherein at least two demodulation pixels in each case form a common aperture, wherein the separating device comprises a drift gate for attracting the charge carriers from the conversion region into the separating region and wherein the demodulation pixels forming a common aperture in each case form at least one common drift gate and an individually assigned drift gate, wherein the individually assigned drift gate intersects with the common drift gate in an electrically separated manner and the individually assigned drift gate and the common drift gate act was a single drift gate, wherein a higher potential is applied to the individually assigned drift gate than to the common drift gate such that photoelectrons are forwarded from the common drift gate to the individually assigned drift gate.

2. The time of flight distance sensor as claimed in claim 1, wherein the common aperture forms a closed circumference.

3. The time of flight distance sensor as claimed in claim 1, wherein the demodulation pixels each comprise an electronic evaluation region and wherein at least two demodulation pixels in each case form a spatially common evaluation region.

4. The time of flight distance sensor as claimed in claim 1, wherein four demodulation pixels in each case form a common aperture and wherein four demodulation pixels in each case form a spatially common evaluation region.

5. The time of flight distance sensor as claimed in claim 4, wherein the apertures and evaluation regions form a checkerboard pattern.

6. The time of flight distance sensor as claimed in claim 1, wherein the conversion region is formed from a doped substrate.

7. The time of flight distance sensor as claimed in claim 6, wherein the conversion region is formed from at least one of an n–doped semiconductor substrate or a transparent rear-side electrode for depleting the substrate.

8. The time of flight distance sensor as claimed in claim 1, wherein the separating device comprises:
   at least one drift gate on the upper side of the substrate for attracting the charge carriers from the conversion region into the separating device and/or at least one modulation gate on the upper side of the substrate at opposing positions of the drift gate for alternately guiding the charge carriers in accordance with the modulation frequency from the drift gate to the modulation gates and/or
   at least one storage gate on the upper side of the substrate in each case assigned to a modulation gate for collecting the charge carriers directed toward the assigned modulation gate, and/or at least one transfer gate on the upper side of the substrate in each case assigned to a storage gate for intermittent forwarding of the charge carriers collected at the storage gates to floating diffusions, and/or at least one floating diffusion in the upper side of the substrate as an n+ doped well in each case assigned to a transfer gate for receiving the charge carriers forwarded by the transfer gates and for feeding same as voltage into the evaluation region, wherein the gates are separated from the substrate by a nonconductive layer.

9. The time of flight distance sensor as claimed in claim 8, wherein the separating device forms a conductive channel between the stop and a modulation gate and/or a storage gate and/or a transfer gate, and the stop is formed by a layer buried in the substrate.

10. The time of flight distance sensor as claimed in claim 8, wherein the at least one modulation gate is two modulation gates, the at least one storage gate is two storage gates, and the at least one transfer gate is two transfer gates.

11. The time of flight distance sensor as claimed in claim 1, wherein the stop comprises a buried layer in the substrate.

12. The time of flight distance sensor as claimed in claim 11, wherein the stop comprises a pSub layer dopted by p+.

13. The time of flight distance sensor as claimed in claim 1, further comprising an evaluation region formed in the modulation pixel, said evaluation region comprising a source follower, a reset switch, and a select transistor.

14. The time of flight distance sensor as claimed in claim 1, wherein the separating device forms a conducting channel.

* * * * *